(12) United States Patent
Watanabe et al.

(10) Patent No.: US 9,471,028 B2
(45) Date of Patent: Oct. 18, 2016

(54) OPTICAL SCANNING DEVICE AND IMAGE FORMING APPARATUS

(71) Applicants: Kazunori Watanabe, Tokyo (JP); Yoshinobu Sakaue, Kanagawa (JP); Susumu Narita, Kanagawa (JP); Hiroshi Johno, Kanagawa (JP)

(72) Inventors: Kazunori Watanabe, Tokyo (JP); Yoshinobu Sakaue, Kanagawa (JP); Susumu Narita, Kanagawa (JP); Hiroshi Johno, Kanagawa (JP)

(73) Assignee: RICOH COMPANY, LIMITED, Tokyo (JP)

( * ) Notice: Subject to any disclaimer, the term of this patent is extended or adjusted under 35 U.S.C. 154(b) by 0 days.

(21) Appl. No.: 15/046,468

(22) Filed: Feb. 18, 2016

(65) Prior Publication Data

US 2016/0161906 A1    Jun. 9, 2016

Related U.S. Application Data

(63) Continuation of application No. 14/720,022, filed on May 22, 2015, now Pat. No. 9,298,121.

(30) Foreign Application Priority Data

May 26, 2014    (JP) .................................. 2014-107909

(51) Int. Cl.
*G03G 15/04*    (2006.01)
*G03G 21/16*    (2006.01)
*G02B 26/12*    (2006.01)
*B41J 2/385*    (2006.01)
*G10K 11/00*    (2006.01)

(52) U.S. Cl.
CPC .......... *G03G 21/1619* (2013.01); *B41J 2/385* (2013.01); *G02B 26/12* (2013.01); *G03G 15/04* (2013.01); *G10K 11/002* (2013.01)

(58) Field of Classification Search
USPC ....... 399/1–4, 107, 110, 118, 177, 206, 208, 399/220, 221; 347/225, 241, 242, 256, 257
See application file for complete search history.

(56) References Cited

U.S. PATENT DOCUMENTS 7,782,352 B2    8/2010  Ohsugi
9,360,790 B2 *  6/2016  Johno .................... G03G 15/04

FOREIGN PATENT DOCUMENTS

JP    06-051228 A    2/1994
JP    2005202117 A   7/2005

* cited by examiner

*Primary Examiner* — Hoan Tran
(74) *Attorney, Agent, or Firm* — Harness, Dickey & Pierce, P.L.C.

(57) ABSTRACT

An optical scanning device includes a light source configured to emit a light beam; a rotary deflector configured to perform optical scanning by reflecting and deflecting the light beam emitted from the light source while rotating; an optical system forming member configured to form a path of the light beam; and a resonator having a resonance frequency corresponding to a sound generated by rotational drive of the rotary deflector. The rotary deflector is installed in a closed space. The resonator is installed so that the sound within the closed space is absorbed.

14 Claims, 6 Drawing Sheets

OPTICAL SCANNING DEVICE AND IMAGE FORMING APPARATUS

CROSS-REFERENCE TO RELATED APPLICATION

This application is a continuation application of and claims priority under 35 U.S.C. §120/121 to U.S. application Ser. No. 14/720,022 filed May 22, 2015, which claims priority to Japanese Patent Application No. 2014-107909 filed in Japan on May 26, 2014, the entire contents of each of which are hereby incorporated herein by reference.

BACKGROUND OF THE INVENTION

1. Field of the Invention

The present invention relates to an optical scanning device and an image forming apparatus including the optical scanning device.

2. Description of the Related Art

An image forming apparatus such as a printer, a copier, or a facsimile machine includes an optical scanning device that forms a latent image by irradiating a photoconductor with a light beam emitted from a light source. Such image forming apparatus acquires an image by developing the latent image formed on the photoconductor into a visible image, transferring the visible image directly from the photoconductor or through an intermediate transfer body to a transfer material, and fixing the visible image onto the transfer material.

The optical scanning device includes the light source, a polygon scanner being a rotary deflector, a pre-polygon optical system installed on a path of a light beam from the light source to the polygon scanner, a scanning lens, and a reflecting mirror. These components are mounted to a base member of the optical scanning device and covered with a cover member in order to prevent deposition of dust or dirt on the component items, where the base member and the cover member together form a casing of the optical scanning device. Moreover, dust-proof glass is installed at an opening of the casing and configured to prevent the dust or dirt from entering the casing, the opening being a light path through which the light beam emitted toward the outside of the casing passes.

The polygon scanner forms a latent image by rotating a polyhedral mirror at high speed and scanning the light beam from the light source on the photoconductor. A sound generated when driving the polygon scanner such as a wind noise of the polyhedral mirror rotating at high speed possibly becomes a noise that causes discomfort to a person around the image forming apparatus such as a user thereof, when the sound is transmitted to the outside of the apparatus.

Japanese Laid-open Patent Publication No. 2005-202117 and Japanese Laid-open Patent Publication No. H06-051228 disclose an optical scanning device which absorbs a sound that can possibly become a noise by including, in the casing, a resonator with a resonance frequency corresponding to the frequency of the sound generated when the polygon scanner is driven.

As with the optical scanning device of the related art, however, there is a case where a gap allowing air to pass therethrough is formed at a joint portion between the base member and the cover member of the casing which houses therein the components including the polygon scanner and prevents dust or dirt from entering the casing. Such gap can cause the sound generated in the casing to be transmitted to the outside through air, whereby it has been unable to sufficiently suppress the leakage of the sound generated from the polygon scanner to the outside.

Therefore, there is a need to provide an optical scanning device which can further suppress transmission of a sound to the outside compared to the related art and an image forming apparatus including the optical scanning device, the sound being generated when the rotary deflector is rotationally driven.

SUMMARY OF THE INVENTION

It is an object of the present invention to at least partially solve the problems in the conventional technology.

According to an embodiment, there is provided an optical scanning device that includes a light source configured to emit a light beam; a rotary deflector configured to perform optical scanning by reflecting and deflecting the light beam emitted from the light source while rotating; an optical system forming member configured to form a path of the light beam; and a resonator having a resonance frequency corresponding to a sound generated by rotational drive of the rotary deflector. The rotary deflector is installed in a closed space. The resonator is installed so that the sound within the closed space is absorbed.

According to another embodiment, there is provided an image forming apparatus for forming an image by irradiating a surface of a latent image bearer with a light beam by using the optical scanning device according to the above embodiment to form a latent image on the surface of the latent image bearer and by transferring an image obtained by developing the latent image onto a recording material.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Embodiments of the present invention applied to a copier (hereinafter referred to as a copier 500) functioning as an image forming apparatus will be described below.

Figure 2:
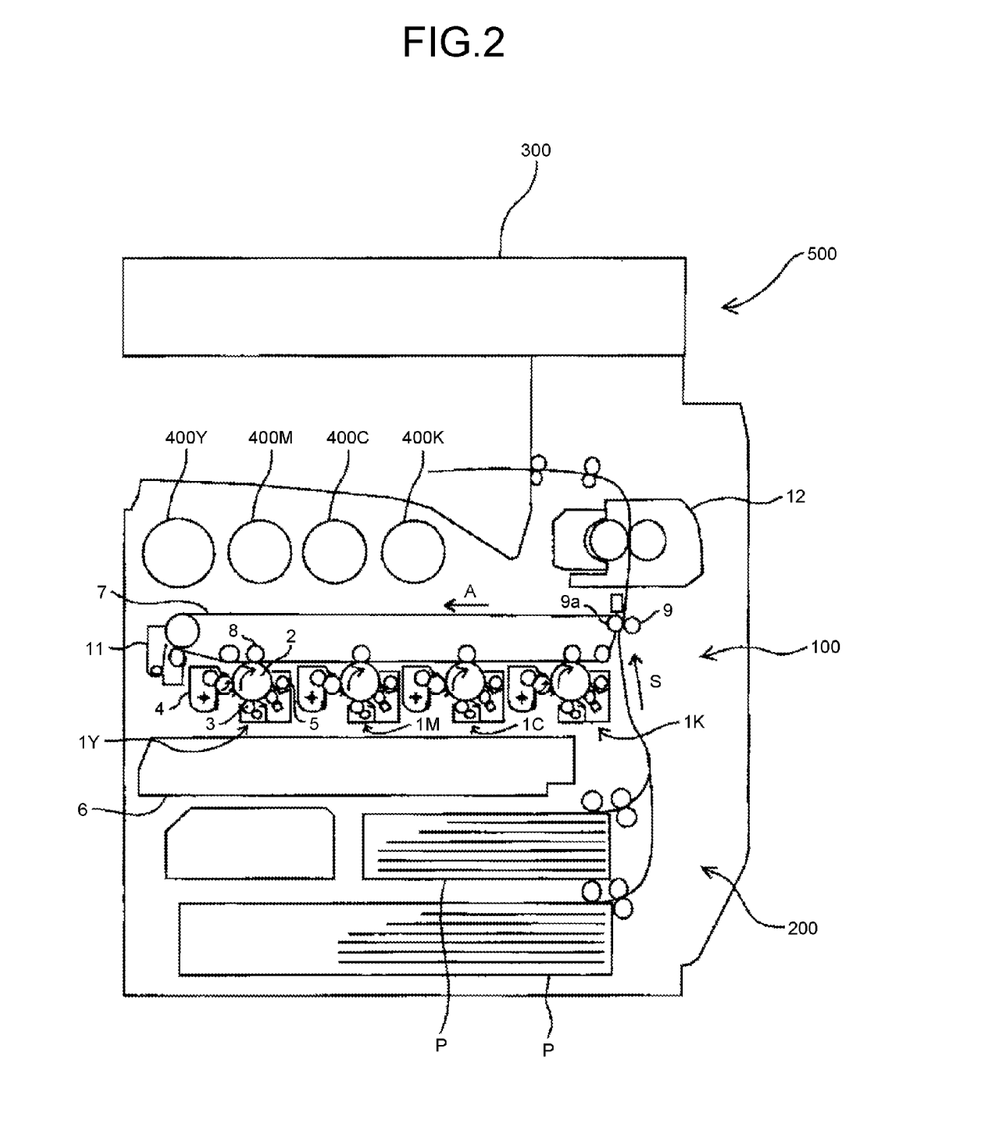
FIG. 2 is a schematic configuration diagram of a copier according to an embodiment.

FIG. 2 is a schematic configuration diagram of the copier 500. The copier 500 includes a copier body (hereinafter referred to as a printer unit 100), a paper feeding table (hereinafter referred to as a paper feeding unit 200), and a scanner (hereinafter referred to as a scanner unit 300) attached on the printer unit 100.

The printer unit 100 includes four process cartridges 1 (Y, M, C, K) as process units, an intermediate transfer belt 7, an exposure device 6 as an exposure unit, and a fixing device 12 as a fixing unit. The intermediate transfer belt 7 is an intermediate transfer body moving in a direction indicated by an arrow A in FIG. 2 while stretched by a plurality of stretching rollers.

The indexes Y, M, C, and K attached to the reference numeral of the four process cartridges 1 indicate that the cartridges are adapted for yellow, magenta, cyan, and black, respectively. The four process cartridges 1 (Y, M, C, K) have substantially the same configuration except for a toner color different in each cartridge, whereby the indexes K, Y, M, and C will be omitted in the following description.

The process cartridge 1 has a configuration that integrally supports and makes into a unit a photoconductor 2 being a latent image bearer, a charging member 3 being a charging unit, a developing device 4 being a developing unit and a photoconductor cleaner 5 being a cleaning unit. Each process cartridge 1 is made detachable from the body of the copier 500 by releasing a stopper not illustrated.

The photoconductor 2 rotates clockwise in the figure as indicated by an arrow therein. The charging member 3 is a roller-shaped charging roller that is pressed against a surface of the photoconductor 2 and rotates while driven by the rotation of the photoconductor 2. A predetermined bias is applied to the charging member 3 by a high-voltage power supply (not illustrated) at the time of image formation, and charges the surface of the photoconductor 2. While the process cartridge 1 of the present embodiment uses the roller-shaped charging member 3 in contact with the surface of the photoconductor 2 as the charging unit, a non-contact charging method such as corona charging may be adopted as the charging unit as well.

The exposure device 6 forms an electrostatic latent image on the surface of the photoconductor 2 by exposing the surface of the photoconductor 2 on the basis of image information of an original image read by the scanner unit 300 or image information input from an external device such as a personal computer. The exposure device 6 included in the printer unit 100 employs a laser beam scanner method which uses a laser diode as a light source.

The photoconductor cleaner 5 cleans a post-transfer residual toner on the surface of the photoconductor 2 passing a position facing the intermediate transfer belt 7.

The four process cartridges 1 form a toner image of each of yellow, cyan, magenta, and black on the photoconductor 2. The four process cartridges 1 are arranged in parallel with a direction of a surface movement of the intermediate transfer belt 7, successively superpose and transfer the toner image formed on each photoconductor 2 onto the intermediate transfer belt 7, and form a visible image on the intermediate transfer belt 7.

As illustrated in FIG. 2, a primary transfer roller 8 as a primary transfer unit is disposed at a position facing each photoconductor 2 while interposing the intermediate transfer belt 7 between the photoconductor and the primary transfer roller. A primary transfer bias is applied to the primary transfer roller 8 by a high-voltage power supply (not illustrated) so that a primary transfer electric field is formed between the primary transfer roller and the photoconductor 2. The primary transfer electric field formed between the photoconductor 2 and the primary transfer roller 8 allows the toner image formed on the surface of the photoconductor 2 to be transferred to the surface of the intermediate transfer belt 7. One of the plurality of stretching rollers stretching the intermediate transfer belt 7 is rotated by a drive motor not illustrated, thereby causing the intermediate transfer belt 7 to surface move in the direction indicated by the arrow A in the figure. The toner image of each color is successively superposed and transferred onto the surface of the surface-moving intermediate transfer belt 7, whereby a full color image is formed on the surface of the intermediate transfer belt 7.

A secondary transfer roller 9 is disposed on a downstream side of the positions at which the four process cartridges 1 face the intermediate transfer belt 7 in the surface-moving direction of the intermediate transfer belt 7. The secondary transfer roller 9 is disposed at a position facing a secondary transfer counter roller 9a that is one of the stretching rollers while interposing the intermediate transfer belt 7 between the rollers, and a secondary transfer nip is formed between the secondary transfer roller and the intermediate transfer belt 7. A secondary transfer electric field is formed by applying a predetermined voltage between the secondary transfer roller 9 and the secondary transfer counter roller 9a. A piece of transfer paper P being a transfer material fed from the paper feeding unit 200 and conveyed in a direction indicated by an arrow S in FIG. 2 passes the secondary transfer nip. When the transfer paper P passes the secondary transfer nip, the full color image formed on the surface of the intermediate transfer belt 7 is transferred onto the transfer paper P by the secondary transfer electric field formed between the secondary transfer roller 9 and the secondary transfer counter roller 9a.

The fixing device 12 is disposed on a downstream side of the secondary transfer nip in the conveyance direction of the transfer paper P. The transfer paper P passing the secondary transfer nip reaches the fixing device 12. The full color image transferred onto the transfer paper P is fixed by heat and pressure applied thereto in the fixing device 12, and then the transfer paper P to which the image is fixed is output to the outside of the copier 500.

On the other hand, a toner not transferred to the transfer paper P at the secondary transfer nip and remaining on the surface of the intermediate transfer belt 7 is collected by a transfer belt cleaner 11.

As illustrated in FIG. 2, toner bottles 400 (Y, M, C, K) each accommodating a toner of a corresponding color are detachably disposed on the body of the copier 500 above the intermediate transfer belt 7.

The toner accommodated in the toner bottle 400 of each color is supplied to the developing device 4 of each color by a toner supply device (not illustrated) corresponding to each color.

The developing device 4 may adopt either double-component development which uses a double-component developer formed of a toner and a carrier, or single-component development which uses a single-component developer formed solely of a toner.

Next, the exposure device 6 that is an optical scanning device will be described.

Figure 3:
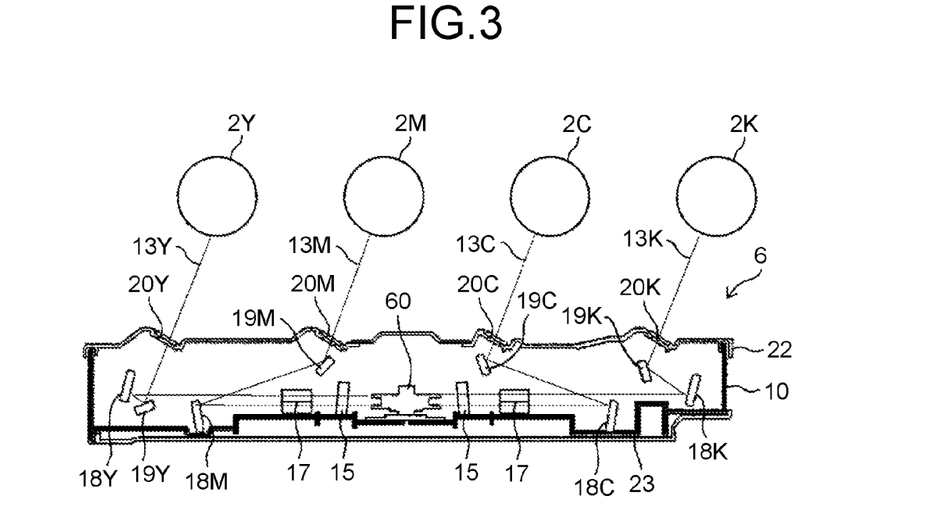
FIG. 3 is a diagram illustrating a schematic cross section of the exposure device and a path of laser light emitted toward a photoconductor.

FIG. 3 is a diagram illustrating a schematic cross section of the exposure device 6 and a path of laser light emitted toward each of the photoconductors 2 (Y, M, C, K).

As illustrated in FIG. 3, the exposure device 6 includes a polygon scanner 60 that is a rotary deflector having a reflecting mirror on a side face of a polyhedron and deflecting/scanning laser light by high-speed rotation. The exposure device further includes a scanning lens 17 having both an fθ correction function and an optical face tangle error correction function against the laser light reflected by the polygon scanner 60, and soundproof glass 15 as a light transmission member transmitting the laser light while interrupting the space between the polygon scanner 60 and the scanning lens 17. Moreover, the exposure device includes first reflecting mirrors 18 (Y, M, C, K) and second reflecting mirrors 19 (Y, M, C, K) guiding the laser light passing the scanning lens 17 to each of the corresponding photoconductors 2 (Y, M, C, K). Further provided is dust-proof glass 20 (Y, M, C, K) disposed on a light path of the laser light that is reflected off of the second reflecting mirrors 19 (Y, M, C, K) and emitted toward the outside of the exposure device 6, and preventing dust or dirt from dropping into the casing.

The casing of the exposure device 6 is formed of a housing 10 (optical housing) which is a base member as well as an upper cover 22 and a lower cover 23 which are cover members. The housing 10 is an optical box made of resin in which optical elements such as the polygon scanner 60, the scanning lens 17, and the reflecting mirrors (18 and 19) are disposed, whereas the upper cover 22 and lower cover 23 are the cover members covering the interior in which the optical elements are disposed and the exterior of the housing 10. Moreover, as illustrated in FIG. 3, the paths of laser light emitted toward the photoconductors 2 (Y, M, C, K) are indicated as light paths 13 (Y, M, C, K).

Figure 4:
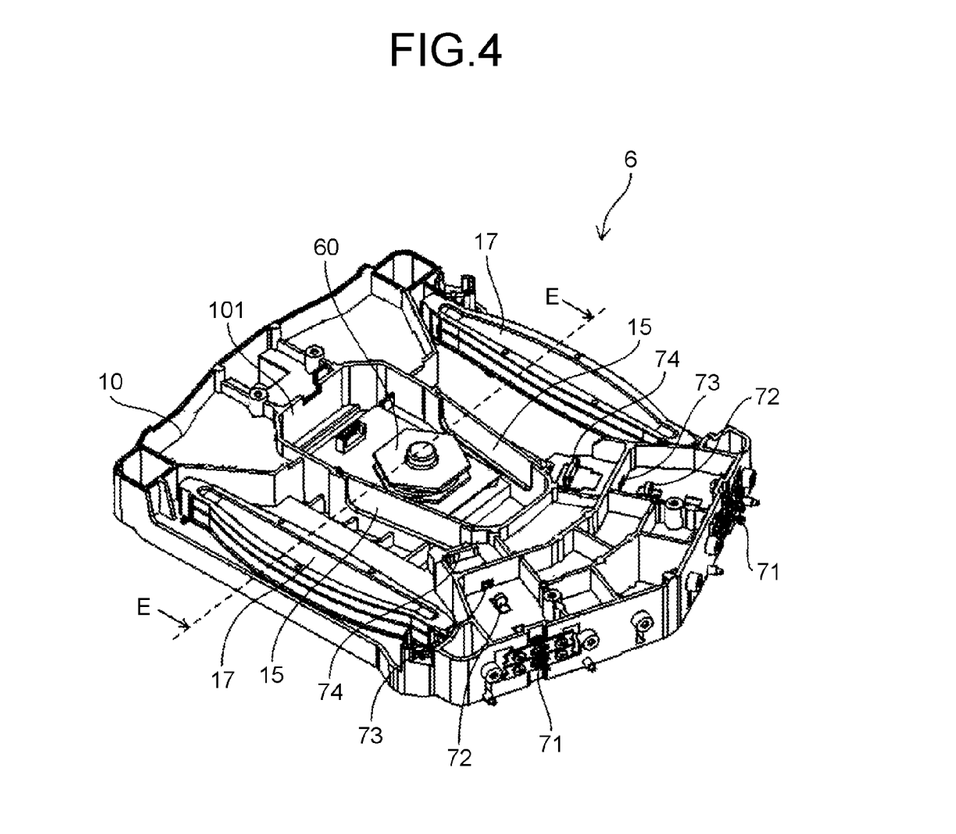
FIG. 4 is a perspective view of a part of the exposure device illustrating an example of a configuration of a pre-polygon optical system through which a light beam emitted from a light source portion passes before entering a polygon mirror.

FIG. 4 is a perspective view of a part of the exposure device 6 illustrating an example of a configuration of the pre-polygon optical system that is a pre-deflection optical system through which a light beam emitted from a light source portion 71 passes before entering a polygon mirror 61 of the polygon scanner 60.

The light beam emitted from the light source portion 71 toward the polygon scanner 60 is converted from a divergent light flux into a parallel light flux at a coupling lens 72 and shaped by an aperture 73. The light beam passing through the aperture 73 is concentrated in a sub-scanning direction by a cylindrical lens 74, transmitted through the soundproof glass 15, and enters the polygon mirror 61 of the polygon scanner 60. The coupling lens 72 and the cylindrical lens 74 are fixed to the housing 10 with an adhesive once their installation positions are adjusted. The coupling lens 72, aperture 73, and cylindrical lens 74 are pre-deflection optical system forming members that form the path of light beam from the light source portion 71 being a light source to the polygon scanner 60 being the rotary deflector.

The light beam made incident on the polygon mirror 61 of the polygon scanner 60 is deflected toward the scanning lens 17, transmitted through the scanning lens 17, and then made incident on the photoconductor 2 to expose the surface thereof as illustrated in FIG. 3. The scanning lens 17, first reflecting mirror 18, and second reflecting mirror 19 are post-deflection optical system forming members that form the path of light beam after reflected by the polygon scanner 60 being the rotary deflector.

Figure 1:
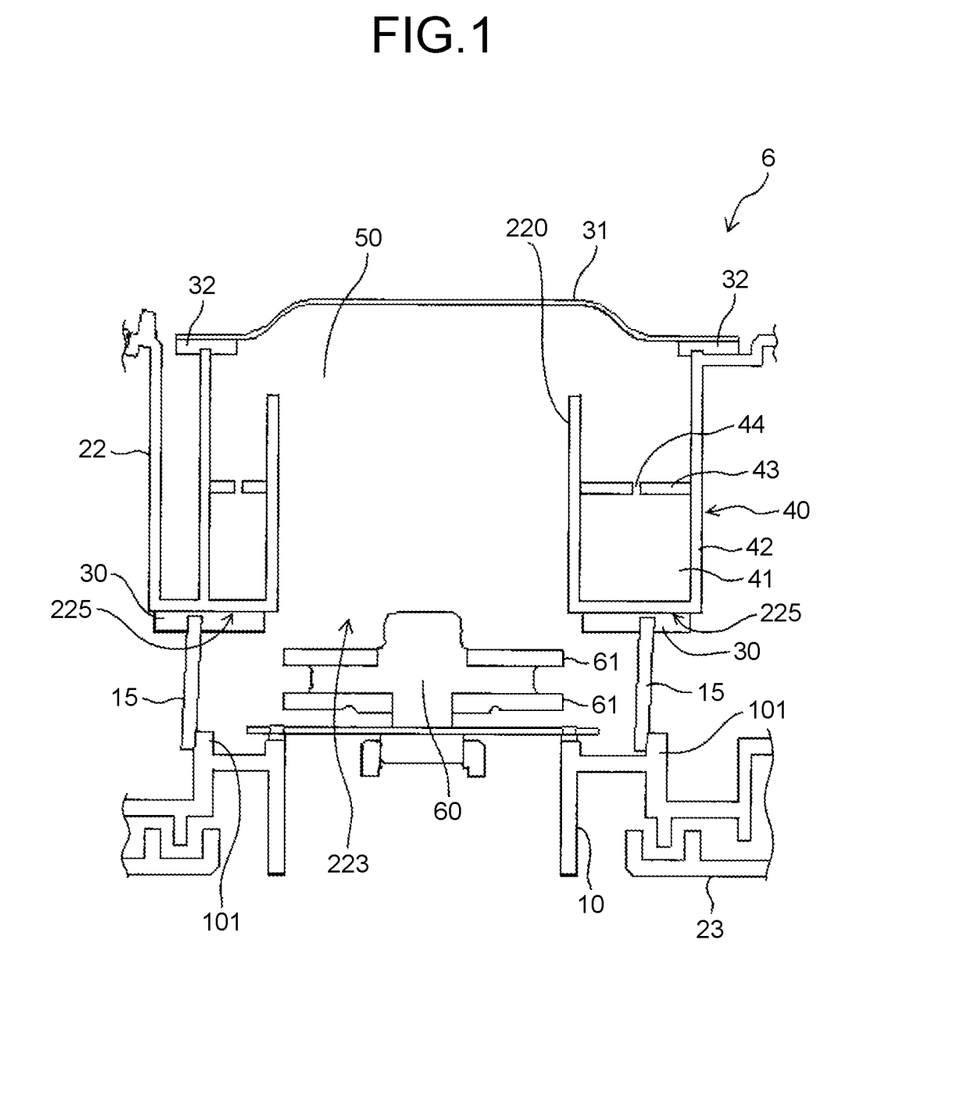
FIG. 1 is an enlarged sectional view illustrating the vicinity of a polygon scanner in an exposure device.
Figure 6:
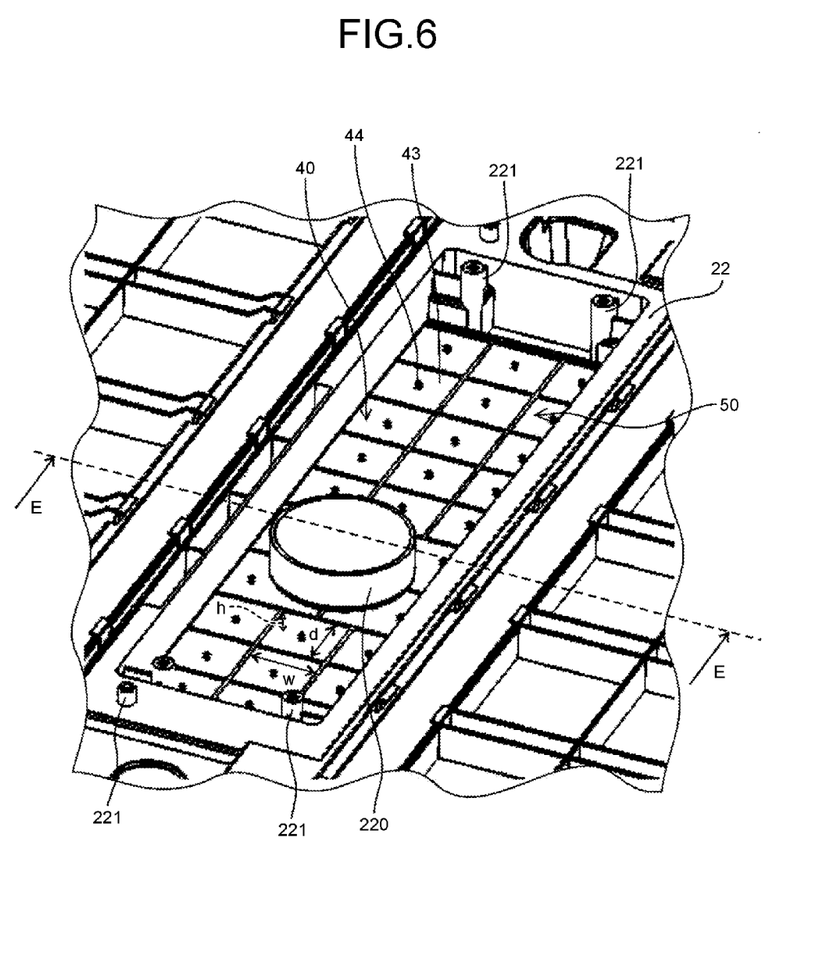
FIG. 6 is a perspective view illustrating an upper part of the polygon scanner before a polygon cover is attached.

FIG. 1 is an enlarged sectional view illustrating the vicinity of the polygon scanner 60 in the exposure device 6. FIG. 6 is a perspective view illustrating an upper part of the polygon scanner 60 after the upper cover 22 is attached to the housing 10 on which the members forming the optical system are mounted and before a polygon cover 31 is attached. FIG. 1 is the sectional view taken along line E-E of FIGS. 4 and 6.

The polygon scanner 60 is fixed to the housing 10 by a screw. The housing 10 forms a side wall portion 101 surrounding the polygon scanner 60. The light path of the light beam emitted from the light source portion 71 toward the polygon scanner 60 and the light beam from the polygon scanner 60 toward the scanning lens 17 corresponds to an opening on the side wall portion 101, where the soundproof glass 15 is disposed to close the opening. The side wall portion 101 forms three edges excluding a top portion in the opening where the soundproof glass 15 is disposed, and the surface of the side wall portion 101 forming the edges faces the surface of an end of the soundproof glass 15. The soundproof glass 15 is fixed to the side wall portion 101 with a double-sided tape at a part where the surfaces face each other.

A housing seal member 30 is formed at the bottom of the upper cover 22 covering the housing 10 to face a top surface of the soundproof glass 15 and a top surface of the side wall portion 101 of the housing 10, and is interposed between the soundproof glass 15 as well as housing 10 and the upper cover 22. The housing seal member 30 fills a gap formed at a joint portion between the soundproof glass 15 as well as housing 10 and the upper cover 22.

As illustrated in FIG. 6, the upper cover 22 includes a screw receiving portion 221 that fixes the polygon cover 31 being a second cover, which is fixed to the upper cover 22 with a screw. A polygon cover seal member 32 is interposed between the upper cover 22 and the polygon cover 31, and fills a gap formed at a joint portion between the polygon cover 31 and the upper cover 22.

With this configuration, the installation space for the polygon scanner 60 can be closed to form a closed space 50.

Figure 5:
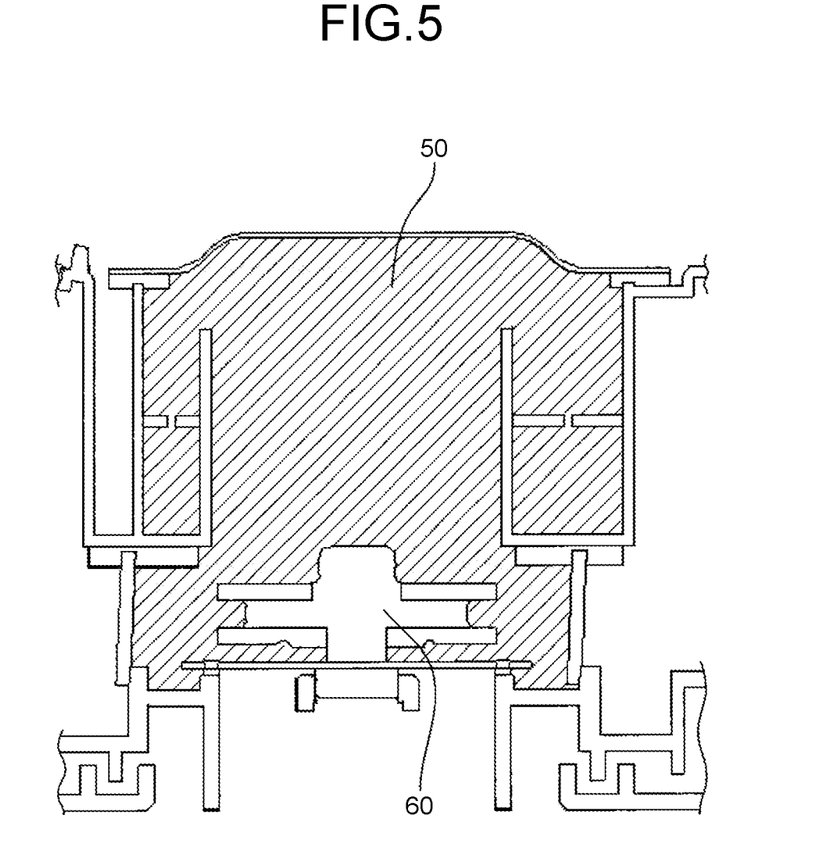
FIG. 5 is a diagram illustrating bounds of a closed space in the cross section illustrated in FIG. 1.

FIG. 5 is a diagram illustrating bounds of the closed space 50 in the cross section illustrated in FIG. 1, where a shaded area in FIG. 5 indicates the bounds of the closed space 50.

The polygon mirror 61 being a polyhedron mirror of the polygon scanner 60 is rotated at high speed, thereby generating a wind noise caused by an edge of the polygon mirror 61. The installation space for the polygon scanner 60 is closed to be able to prevent the wind noise from being transmitted to the outside of the apparatus through the air and thus reduce a noise caused by the wind noise. On the other hand, the installation space for the polygon scanner 60 is closed so that heat generated by the operation of the polygon scanner 60 cannot escape and that the temperature in the closed space 50 gets high. Accordingly, the polygon cover 31 is made of metal (sheet metal) to let the heat escape to the outside through the metal polygon cover 31 and prevent the increase in temperature in the closed space 50.

As illustrated in FIG. 1, a sound absorber 40 being a resonator is provided to the upper cover 22. The sound absorber 40 is formed of a cavity 41 having a certain volume and a communication hole 44 smaller than the cavity, and absorbs a sound of a specific frequency entering the communication hole 44. In the configuration illustrated in FIG. 1, a sound absorbing body portion 42 forming wall surfaces of the cavity 41 excluding a wall surface provided with the communication hole 44 forms a part of the upper cover 22, while a sound absorbing cover portion 43 forming the wall surface provided with the communication hole 44 is formed of a member different from the upper cover 22.

A cylindrical wall 220 is erected from a cover opening 223 in the upper cover 22, where an air current generated when driving the polygon scanner 60 flows upward along an inner peripheral surface of the cylindrical wall 220. Moreover, as illustrated in FIG. 1, the sound absorber 40 is provided on a side of the upper cover 22 opposite from a surface (reference numeral "225" in FIG. 1) facing a top surface of the soundproof glass 15 and a top surface of the side wall portion 101 of the housing 10.

The perspective diagram illustrating the upper part of the polygon scanner 60 in FIG. 6 is a perspective view of the top of the closed space 50 described above. The polygon cover 31 is not illustrated in FIG. 6 for the sake of description. The top of the closed space 50 illustrated in FIG. 6 is connected to the bottom of the closed space 50, at which the polygon scanner 60 is installed, through space inside the cylindrical wall 220.

A plurality of the sound absorbers 40 is disposed at the bottom surface of the upper cover 22 around the cylindrical wall 220. The communication hole 44 is opened in the sound absorbing cover portion 43 of each sound absorber 40 where an upper end (top surface of the sound absorbing cover portion 43) of the communication hole 44 is located lower than an upper end of the cylindrical wall 220, and the communication hole 44 is communicated in a direction roughly parallel to a rotational axis of the polygon scanner 60. The cavity 41 of the sound absorber 40 has a width w, a depth d and a height h.

The sound generated from the polygon scanner 60 travels through the space inside the cylindrical wall 220 and is reflected off of the polygon cover 31. The communication hole 44 of the sound absorber 40 is opened at the top thereof in order to make it easy to take in the sound reflected off of the polygon cover 31.

Moreover, the plurality of sound absorbers 40 is provided at the top of the upper cover 22 located within the closed space 50 in which the polygon scanner 60 is installed, so that many of the sound reflected off of the polygon cover 31 can be taken into the sound absorber 40.

Figure 7:
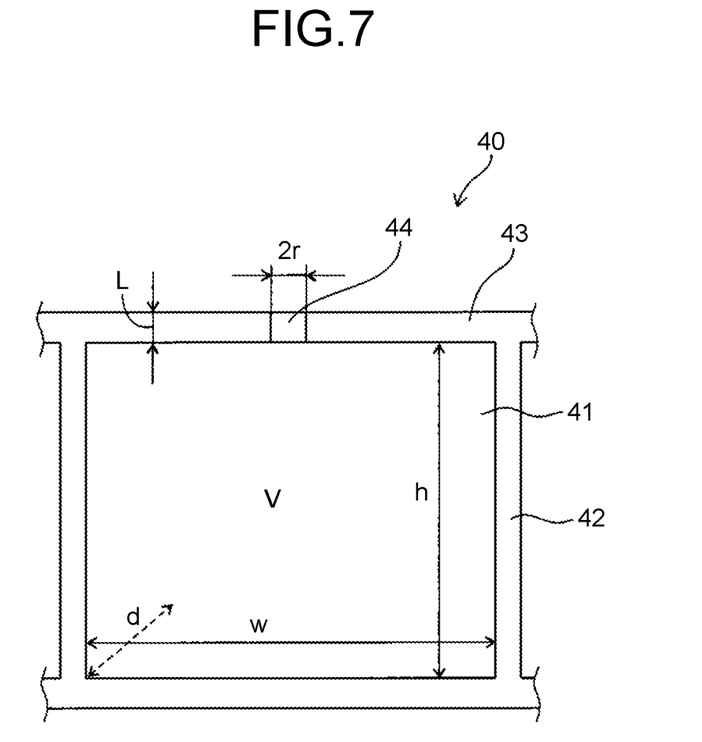
FIG. 7 is a schematic sectional view of a sound absorber.

FIG. 7 is a schematic sectional view of the sound absorber 40. The sound absorber 40 of the present embodiment absorbs a sound on the basis of a principle of sound absorption using a known Helmholtz resonator. Therefore, a resonance frequency of the sound absorber 40 is set equal to the frequency of the wind noise generated by the polygon scanner 60 so that the wind noise generated by the polygon scanner 60 can be absorbed.

Where V is the volume of the cavity 41, S is the area of opening of the communication hole 44, L is the length of the communication hole 44 (thickness of the sound absorbing cover portion 43), c is the sound speed, and f is the resonance frequency of the sound absorber 40, the following Equation (1) holds true.

$$f = \frac{c}{2\pi} \sqrt{\frac{S}{V(L + \Delta r)}} \quad (1)$$

When the opening of the communication hole 44 has a circular shape with r corresponding to the radius of the opening, the following Equation (2) holds true.

$$f = \frac{c}{2\pi} \sqrt{\frac{\pi r^2}{V(L + \Delta r)}} \quad (2)$$

Opening end correction is indicated by $\Delta r$ in Equations (1) and (2), where $\Delta r = 0.6r$ is normally used when the opening of the communication hole 44 has the circular shape with the radius r.

It is assumed that the dimensions of the sound absorber 40 are r=6.5 [mm], L=2[mm], V=w×d×h=20 [mm]×20 [mm]× 18.3 [mm], and $\Delta$=0.6, for example. The resonance frequency f under this setting equals 3000 [Hz].

When the polygon mirror 61 of the polygon scanner 60 is a regular hexagon and has the rotational speed of 30000 [rpm], the frequency of the wind noise generated by each edge (each of six corners of the regular hexagon) can be found as follows.

First, the frequency of a sound generated every rotation can be found as follows.

30000 [rpm]/60 [sec]=500 [Hz]

The wind noise generated by each edge of the polygon mirror 61 has a frequency six times as high as the sound generated every rotation, whereby the frequency equals 500 [Hz]×6=3000 [Hz]. This value corresponds with the value of the resonance frequency f of the sound absorber 40 above, whereby the wind noise generated by each edge can be absorbed by the sound absorber 40 with the aforementioned setting.

The resonance frequency of the sound absorber 40 can be changed by changing the width, depth, height of the cavity 41 as well as the opening diameter of the communication hole 44.

A production rate (number of sheets output per unit time) of the image forming apparatus may change by the thickness of the transfer paper P onto which an image is to be formed and a pixel density of the image formed. In this case, the rotational speed of the polygon scanner 60 is changed as well. With the configuration where the rotational speed of the polygon scanner 60 is changed, the generation of noise can be prevented by providing the plurality of sound absorbers 40 corresponding to a plurality of resonance frequencies, even when the production rate is changed.

A sound may be generated by pressure fluctuation within the cavity 41 of the sound absorber 40 when there is an air current in the vicinity of an inlet of the communication hole 44. With this configuration where the sound is generated, a noise cannot be reduced by installing the sound absorber 40 in the vicinity of the polygon scanner 60. The rotation of the polygon scanner 60 also generates an air current within the closed space 50.

Now, the exposure device 6 of the present embodiment is configured to guide the air current generated by the rotation of the polygon scanner 60 to a position away from the inlet of the communication hole 44 of the sound absorber 40 and moderate the air current in the vicinity of the inlet of the communication hole 44. Specifically, as illustrated in FIG. 1, an upper end of the cylindrical wall 220 erected from the cover opening 223 is brought closer to the polygon cover 31 to be positioned higher than the inlet of the communication hole 44 of the sound absorber 40.

The sound absorber 40 provided in the upper cover 22 cannot be molded in integration therewith when the upper cover 22 is made of resin. Therefore, in the present embodiment, the sound absorbing cover portion 43 is formed of a member separate from the upper cover 22, the sound absorbing cover portion forming the wall surface provided with the communication hole 44 among the wall surfaces of the cavity 41. The sound absorber 40 may also be configured to make the sound absorbing cover portion 43 a part of the upper cover 22 and form the sound absorbing body portion 42 with a member separate from the upper cover 22, the sound absorbing body portion forming the wall surfaces of the cavity 41 excluding the wall surface provided with the communication hole 44. It may also be configured to form all parts forming the sound absorber 40 with an item separate from the upper cover 22 and mount the sound absorber 40 made as the separate item on the upper cover 22.

As described above, the exposure device 6 of the present embodiment is configured to install the polygon scanner 60 being a source of noise in the closed space 50 and to dispose therein the sound absorber 40 absorbing the sound generated when driving the polygon scanner 60. This configuration can prevent transmission of the sound generated in driving the polygon scanner 60 to the outside of the exposure device 6 and prevent the sound from being transmitted to the outside of the copier 500 to become a noise, thereby leading to an improvement in the commercial value as the low-noise image forming apparatus.

While the present embodiment has the configuration where the optical scanning device including the characteristic units of the present invention is applied to the exposure device 6 included in the copier 500 being a color image forming apparatus, the optical scanning device according to the present invention is applicable not only to the color image forming apparatus but also a single-color image forming apparatus.

A problem with an optical scanning device of the related art will now be described.

A polygon scanner included in the optical scanning device forms a latent image by rotating a polyhedral mirror at high speed and scanning a light beam from a light source on a photoconductor. Where the rotational speed of the polygon scanner is determined on the basis of the speed of conveying a transfer material and the number of light beams emitted, the polygon scanner is rotated at high speed with the minimum number of light beams since an increased number of light beams increases cost. There is as a result generated a high frequency sound corresponding to a period of one rotation of the polygon scanner or a period at which one face of a polyhedron passes.

The optical scanning device of the related art includes a certain shield structure that prevents dust or dirt from entering a casing and that can prevent, to some degree, transmission of the sound generated in driving the polygon scanner to the outside. This can reduce to some degree the volume of the sound generated in driving the polygon scanner and transmitted outside the device. The sound generated in driving the polygon scanner being the high frequency sound, however, there has been a problem that the sound is heard by a human ear as an unpleasant sound which is likely to become a noise even when the volume of the sound is reduced.

On the other hand, the exposure device 6 functioning as the optical scanning device in the present embodiment reduces the sound generated in driving the polygon scanner 60 within the exposure device 6 to be able to prevent transmission of the unpleasant sound to a user outside.

The exposure device 6 is configured to close the polygon scanner 60. The installation space for the polygon scanner 60 is the closed space 50 closed by the bottom surface of the housing 10, the side wall portion 101 of the housing 10, the soundproof glass 15, the upper cover 22 and the polygon cover 31. The upper cover 22 is a cover member covering the housing 10 and shielding the entire exposure device 6 from the outside, while the polygon cover 31 is a second cover member covering a part of the upper cover 22.

The soundproof glass 15 is fixed to the side wall portion 101 of the housing 10 with a double sided tape and disposed to leave no space between the glass and the side wall portion. The upper cover 22 has a surface that faces the top surface of the soundproof glass 15 and the top surface of the side wall portion 101 of the housing 10 and is brought into close contact with the top surfaces by the housing seal member 30 or the like. The cover opening 223 provided above the polygon scanner 60 and space above the opening are closed by the polygon cover 31, so that the installation space for the polygon scanner 60 becomes the closed space 50 independent from another optical system. The transmission of the sound generated in driving the polygon scanner 60 through the air to the outside can be prevented to thus prevent the sound from becoming a noise by closing the installation space for the polygon scanner 60. Moreover, the installation space for the polygon scanner 60 is the closed space 50 independent from the other optical system, whereby the closed range can be kept to the minimum to be able to enhance sealing property and performance to prevent the transmission of the sound.

The sound absorber 40 is provided at a part of where the closed space 50 of the upper cover 22 is formed. The shape of the sound absorber 40 is set to have the resonance frequency corresponding to a sound with a frequency according to the period of one rotation of the polygon scanner 60 and a sound with a frequency according to the period at which one face of the polygon mirror 61 of the polygon scanner 60 passes. Moreover, the communication hole 44 of the sound absorber 40 faces upward (in the direction of the rotational axis of the polygon scanner 60) so that a sound from the polygon scanner 60 is reflected off of the polygon cover 31 and absorbed and attenuated by the sound absorber 40. The plurality of sound absorbers 40 provided can attenuate most of the sound reflected within the closed space 50 and thus prevent the noise.

The cover opening 223 is provided to the upper cover 22 above the polygon scanner 60 of the exposure device 6, while the cover opening 223 is provided with the cylindrical wall 220 extending upward. The air current generated in driving the polygon scanner 60 flows upward along the cylindrical wall 220. The upper end of the cylindrical wall 220 is located higher than the inlet of the communication hole 44, so that the air current in the closed space 50 flowing from the vicinity of the polygon scanner 60 takes a roundabout path from above the upper end of the cylindrical wall 220 toward the inlet of the communication hole 44. As a result, the air current generated by rotationally driving the polygon scanner 60 does not affect the vicinity of the inlet of the communication hole 44, whereby the generation of sound caused by the air current in the vicinity of the inlet of the communication hole 44 can be prevented.

The copier 500 being the image forming apparatus can set a plurality of production rates of image output. The production rate is changed according to the paper thickness or the like of the transfer paper P, and the rotational speed of the polygon scanner 60 is changed as the production rate is changed. The frequency of the sound generated in driving the polygon scanner 60 changes as the rotational speed of the polygon scanner 60 is changed. The plurality of sound absorbers 40 having different resonance frequencies can prevent the generation of noise even when the frequency of the generated sound changes as the rotational speed of the polygon scanner 60 is changed.

The exposure device 6 being the optical scanning device of the present embodiment can reduce the generation of noise therefrom by closing the polygon scanner 60 and attenuating the sound within the closed space 50 with the sound absorber 40 as described above.

Japanese Laid-open Patent Publication No. 2005-202117 discloses a configuration where a resonance space is provided under a polygon substrate, but it is unclear whether or not an installation space for a polygon scanner is closed. A space formed of the back of the polygon substrate, a housing and a cover is described as a closed space, while there is no description of sealing property of a space provided with a polygon mirror which generates a wind noise.

Japanese Laid-open Patent Publication No. H06-051228 discloses an optical scanning device in which a sound absorber formed in integration with a housing is disposed above a polygon scanner. This configuration is similar to the exposure device 6 of the present embodiment in that the noise is reduced by using the sound absorber to attenuate the sound from the polygon scanner. However, there is no description of a configuration that closes the space provided with the polygon scanner such as provision of a seal member at a joint portion between members forming the space in which the polygon scanner is provided. Moreover, in the optical scanning device described in Japanese Laid-open Patent Publication No. H06-051228, the sound absorber is disposed above the polygon scanner so that an air current generated when rotationally driving the polygon scanner passes the vicinity of an inlet of a communication hole of the sound absorber, thereby possibly causing generation of a new sound different from the sound-absorbing sound.

On the other hand, in the exposure device 6 of the present embodiment, the installation space for the polygon scanner 60 in which the polygon mirror 61 is installed is the closed space 50, in which the sound absorber 40 is provided. This configuration allows the wind noise generated by the polygon scanner 60 to be trapped inside the closed space 50 and absorbed by the sound absorber 40, so that the transmission of sound to the outside can be reduced.

It is possible that a sound is generated in the sound absorber 40 in consequence of the air current generated by rotationally driving the polygon scanner 60 when the sound absorber 40 is disposed in the closed space 50, as is the case with the exposure device 6. To address this issue, the exposure device 6 is configured such that the upper end of the cylindrical wall 220 forming a communication portion between a top of the closed space 50 and a bottom of the closed space 50 is located higher than the inlet of the communication hole 44 of the sound absorber 40. The top of the closed space 50 in this case refers to the portion illustrated in FIG. 6 and is the space formed above the upper cover 22. On the other hand, the bottom of the closed space 50 is formed below the upper cover 22 and is the space in which the polygon scanner 60 is disposed. The upper end of the cylindrical wall 220 is located higher than the inlet of the communication hole 44 of the sound absorber 40, whereby the air current generated by rotationally driving the polygon scanner 60 does not come into direct contact with the inlet of the communication hole 44.

The exposure device 6 of the present embodiment can trap the wind noise generated by the polygon scanner 60 inside the closed space 50, absorb the sound by using the sound absorber 40, and reduce the transmission of the sound to the outside compared to the related art. The copier 500 including this exposure device 6 can realize a configuration in which a noise caused by the sound generated from the exposure device 6 being the optical scanning device is less likely to be generated.

The copier 500 may be configured to be able to change the speed of image formation and change the rotational speed of the polygon scanner 60 according to the speed of image formation. In this case, as described in the present embodiment, the plurality of sound absorbers 40 having the mutually different resonance frequencies can be provided to make it less likely for the noise caused by the sound generated from the exposure device 6 to be generated even when the rotational speed of the polygon scanner 60 is changed.

In the present embodiment, the sound absorber 40 is provided in the upper cover 22 and on the inner side of the wall surface forming the closed space 50, the upper case being one of the members forming the wall surface of the closed space 50. This allows the sound trapped in the closed space to be more reliably guided to the communication hole 44, thereby achieving increased sound absorbing efficiency.

The sound absorber 40 may be provided not only on the inner side of the wall surface forming the closed space 50 but at any location as long as the sound within the closed space 50 can be absorbed. It may be configured, for example, to bore a hole in a portion of the wall surface forming the closed space 50, form the cavity 41 of the sound absorber 40 on the outer side of the wall surface, and dispose the sound absorbing body portion 42 in a way that the hole bored on the wall surface functions as the communication hole 44 of the sound absorber 40.

The aforementioned description being provided as one example, the present invention has a specific effect for each of the following aspects.

Aspect A

There is provided an optical scanning device such as the exposure device 6 including a light source such as the light source portion 71 which emits a light beam, a rotary deflector such as the polygon scanner 60 which performs optical scanning by reflecting and deflecting the light beam emitted from the light source while rotating, optical system forming members such as the coupling lens 72, the aperture 73, the cylindrical lens 74, the scanning lens 17, the first reflecting mirror 18 and the second reflecting mirror 19 which form a path of the light beam, and a resonator such as the sound absorber 40 which has the resonance frequency set to a sound generated by rotationally driving the rotary deflector, where a space in which the rotary deflector is installed is made into a closed space such as the closed space 50 while the resonator is installed in a way it absorbs the sound within the closed space.

As described in the aforementioned embodiment, this closed space in which the rotary deflector is installed can prevent the sound generated by rotationally driving the rotary deflector from being transmitted to the outside as vibration of gas and trap the sound within the closed space. However, the vibrational energy of the sound is not attenuated by just trapping the sound within the closed space, where the vibration can be transmitted through a member forming the closed space to possibly cause the sound to be transmitted to the outside of the device. To address this issue, the resonator is installed so as to absorb the sound trapped within the closed space thereby absorbing the sound trapped within the closed space and attenuating the vibrational energy of the sound within the closed space. This as a result prevents the transmission of the vibration through the member forming the closed space and further prevents the transmission of the sound to the outside of the device. According to this aspect, the transmission of the sound to the outside of the device can be further suppressed compared to the related art, the sound being generated when rotationally driving the rotary deflector.

Aspect B

In aspect A, the resonator is installed on the inner side of a part of the wall of the upper cover 22 forming the closed space.

The sound absorbing efficiency can thus be increased as described in the aforementioned embodiment.

Aspect C

In aspect A, a hole is bored on a part of the wall of the upper cover 22 forming the closed space, and a cavity portion such as the cavity 41 of the resonator is formed on a side opposite from the closed space while interposing therebetween the wall with the hole, which serves as a communication hole such as the communication hole 44 communicating the cavity portion and the outside.

The sound trapped in the closed space can thus be absorbed as described in the aforementioned embodiment by the configuration where the resonator is provided outside the closed space.

Aspect D

In any one of aspects A to C, a light transmission member such as the soundproof glass 15 transmitting a light beam is provided to interrupt the space between the optical system forming member and the rotary deflector, where the light transmission member constructs a part of the wall surface forming the closed space, and the optical system forming member is installed outside the closed space.

The installation space for the rotary deflector is made into the closed space independent from the other optical system, whereby the closed range can be kept to the minimum to be able to enhance sealing property and performance to prevent the transmission of the sound as described in the aforementioned embodiment.

Aspect E

In any one of aspects A to D, a plurality of the resonators having mutually different resonance frequencies is provided.

The sound can thus be absorbed according to the rotational speed of each of the plurality of rotary deflectors as described in the aforementioned embodiment.

Aspect F

In any one of aspects A to E, a communication direction of a communication portion such as the communication hole 44 of the resonator is parallel to the rotational axis of the rotary deflector.

The sound generated by the rotary deflector and reflected off of the wall surface forming the closed space such as the bottom surface of the polygon cover 31 can thus be absorbed more easily, whereby the performance to prevent the transmission of the sound can be improved to be able to prevent generation of a noise, as described in the aforementioned embodiment.

Aspect G

In any one of aspects A to F, the cavity portion such as the cavity 41 of the resonator and the closed space are communicated by the communication hole such as the communication hole 44 communicating the cavity portion and the outside, and there is provided an air current detouring member such as the cylindrical wall 220 that causes an air current flowing from the vicinity of the rotary deflector toward an inlet of the communication portion of the resonator in the closed space to take a detour path.

As a result, the air current generated by rotationally driving the rotary deflector does not affect the vicinity of the inlet of the communication portion, whereby the generation of sound caused by the air current in the vicinity of the inlet can be prevented as described in the aforementioned embodiment. The generation of the noise can thus be further prevented.

Aspect H

There is provided an image forming apparatus such as the copier 500 which forms a latent image on a surface of a latent image bearer such as the photoconductor 2 by using an optical scanning unit and irradiating the surface of the latent image bearer with a light beam and forms an image by transferring an image obtained by developing the latent image onto a recording material such as the transfer paper P in the end, where an optical scanning device such as the exposure device 6 according to any one of aspects A to G is used as the optical scanning unit.

As a result, there can be provided the image forming apparatus that is less likely to generate the noise caused by the sound generated from the optical scanning device, as described in the aforementioned embodiment.

Aspect I

In aspect H, the image forming apparatus is configured to be able to change a speed of image formation and change a rotational speed of the rotary deflector according to the speed of image formation, and the optical scanning device includes a configuration of the optical scanning device according to aspect E.

As a result, there can be provided the image forming apparatus that is less likely to generate the noise caused by the sound generated from the optical scanning device even when the rotational speed of the rotary deflector is changed, as described in the aforementioned embodiment.

According to the embodiments described above, the transmission of the sound to the outside can be further suppressed compared to the related art, the sound being generated when rotationally driving the rotary deflector.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image forming apparatus comprising:
 a sound source;
 a sound absorber including a main body and a communication hole, the main body forming a cavity and the communication hole being useable for communicating the cavity with an area external to the cavity; and
 a casing, housing the sound source and the sound absorber, the casing including
 a wall portion surrounding the sound source, and
 a cover member, extending in a direction from the cavity to the communication hole, a distance between the cover member and the communication hole being relatively shorter than a distance between the cover member and the sound source.

2. The image forming apparatus according to claim 1, wherein the sound source is a rotator.

3. The image forming apparatus according to claim 2, wherein a wall is provided between the sound source and the communication hole.

4. The image forming apparatus according to claim 1, wherein the sound source is a rotary deflector.

5. The image forming apparatus according to claim 4, wherein a distance between the cover member and a bottom surface of the main body of the sound absorber is relatively shorter than a distance between the cover member and the sound source.

6. The image forming apparatus according to claim 5, wherein
 a closed space is formed by at least the casing and the cover member, and
 the sound source and the sound absorber are installed in the closed space.

7. The image forming apparatus according to claim 6, wherein the sound absorber includes a plurality of sound absorbers, and wherein the plurality of sound absorbers are provided in the closed space to surround the sound source.

8. The image forming apparatus according to claim 7, wherein a material for the wall portion is different from a material for the cover member.

9. The image forming apparatus according to claim 8, wherein the wall portion is made of resin, and the cover member is made of metal.

10. The image forming apparatus according to claim 1, wherein a material for the wall portion is different from a material for the cover member.

11. The image forming apparatus according to claim 10, wherein the wall portion is made of resin, and the cover member is made of metal.

12. The image forming apparatus according to claim 1, wherein a sound absorbing cover portion is formed of a member separate from the main body of the sound absorber, and wherein the communication hole is located in the sound absorbing cover portion.

13. The image forming apparatus according to claim 1, wherein
   a closed space is formed by at least the casing and the cover member, and
   the sound source and the sound absorber are installed in the closed space.

14. The image forming apparatus according to claim 13, wherein the sound absorber includes a plurality of sound absorbers, and wherein the plurality of sound absorbers are provided in the closed space to surround the sound source.

* * * * *